United States Patent [19]

Ennis, Jr.

[11] 3,908,183

[45] Sept. 23, 1975

[54] COMBINED ION IMPLANTATION AND KINETIC TRANSPORT DEPOSITION PROCESS

[75] Inventor: Robert M. Ennis, Jr., Santa Monica, Calif.

[73] Assignee: California Linear Circuits, Inc., La Mirada, Calif.

[22] Filed: Mar. 14, 1973

[21] Appl. No.: 341,153

[52] U.S. Cl. .................. 357/65; 148/180; 148/189; 427/13; 427/34; 29/584; 148/183; 148/187

[51] Int. Cl.².... B05C 5/00; B44D 1/18; B05B 5/00; B01J 17/00

[58] Field of Search.......... 117/212, 93.4 R, 93.4 A, 117/93.3, 93.1 GD; 148/183, 187; 29/584

[56] References Cited

UNITED STATES PATENTS

| | | | |
|---|---|---|---|
| 3,347,701 | 10/1967 | Yamagishi et al. | 117/106 |
| 3,437,734 | 4/1969 | Roman et al. | 13/31 |
| 3,458,368 | 7/1969 | Haberecht | 148/175 |
| 3,516,855 | 6/1970 | Goll et al. | 117/212 |

*Primary Examiner*—John D. Welsh
*Attorney, Agent, or Firm*—Howard A. Silber

[57] ABSTRACT

Combined low energy, high density ion implantation and kinetic transport deposition of refractory or other materials is carried out under very high vacuum conditions. The process facilitates formation of large area, highly doped, shallow semiconductor junctions and the associated electrodes. The steps of pre-implantation cleaning, ion implantation for junction formation, ohmic contact formation by kinetic transport deposition, and postimplantation anneal all are carried out in the same chamber.

Under high vacuum, pre-implantation cleaning and annealing of semi-conductor substrates is accomplished by electron bombardment and concomitant heating from an annular flood filament. Next a conical electron beam vaporizes solid source material within the evacuated chamber, ionizing some of the vaporized particles. The result is a plasma expansion source including ions which are accelerated electrostatically for implantation in the target, and atoms which are kinetically transported toward the target to form an ohmic contact or other metalization layer. Additional build-up of kinetically transported material occurs after ion implantation is complete. Post-implantation annealing is carried out using electron bombardment to heat the targets to above an annealing threshhold for a period of time short enough so that no undesirable diffusion occurs. The substrates then are rapidly forced cooled.

Repeating the process using another source permits different refractory materials to be layered. The combined kinetic transport deposition and ionimplantation into the underlying stratum effectively bonds the second material to the previously deposited layer.

38 Claims, 3 Drawing Figures

COMBINED ION IMPLANTATION AND KINETIC TRANSPORT DEPOSITION PROCESS

BACKGROUND OF THE INVENTION

1. Field of the Invention

The present invention relates to an ion implantation system which facilitates pre- and post-implantation annealing, ion implantation at low energy and with high ion density across a large area, simultaneous and/or subsequent ohmic contact formation, and the use of solid source materials including refractory metals. All steps are accomplished in the same chamber, and at very high vacuum.

2. Description of the Prior Art

A fundamental step in the fabrication of semiconductor devices such as diodes and transistors is the formation of junctions, i.e., adjacent regions of different conductivity in a semiconductor body. Ion implantation has been suggested for this purpose, and offers benefits not possible with diffusion techniques of junction formation. For example, ion implantation permits more accurate control of the junction depth and better control of the dopant gradient at the junction interface. Advantage can be taken of channeling and blocking effects.

But many problems are associated with prior art ion implantation systems. These include:

a. complications in cleaning and preparation of the substrate prior to ion implantation;

b. limitations as to the types of source material useful for ion implantation;

c. complexity in providing the source material to the deposition chamber;

d. difficulty in obtaining implantation over a large surface area, as is desirable, e.g., to form large area, shallow junction diodes having high power capabilities;

e. unavailability of a low energy, high ion density implantation system, operable in a very high vacuum environment;

f. problems in annealing the semiconductor target to repair lattice damage resultant from ion bombardment and to move implanted ions from interstitial to substitutional positions in the lattice; and g. complications in the formation of electrodes or ohmic contacts for the ion implanted regions.

Semiconductor device fabrication generally begins with mechanical polishing of the wafer, followed by a cleaning step in which the polished substrate is chemically etched to provide a fine surface. Residual water, etchant or other cleaning fluids may remain adsorbed on the substrate; these impurities inhibit the production of top quality devices. Lattice defects such as faults or dislocations may exist in the semiconductor body as a result of mechanical polishing. Pre-implantation annealing of the substrate is desirable to recrystallize the lattice, thereby repairing lattice defects, and to evaporate adsorbed liquids.

In the past, annealing was accomplished by heating the substrate in an oven to a temperature between about 400°C. and 600°C. The substrate subsequently was transferred from the annealing oven to the ion implantation chamber. During transfer the substrate was exposed to the ambient atmosphere; oxide formation and/or substrate contamination sometimes occurred. One object of the present invention to provide a semiconductor device fabrication technique in which pre-implantation annealing and cleaning is carried out within the same high vacuum chamber used for ion implantation. Equipment requirements are simplified, improved post-etch cleaning and annealing is accomplished, and the substrate is not handled or transferred prior to implantation.

The types of material available for ion implantation in the past have been limited, and the mechanisms for providing such source materials to the implantation chamber have been complex. Gaseous sources have been preferred. Extracted beam techniques, such as those shown in the U.S. Pat. to Kellett (No. 3,341,754) and Wilson (U.S. Pat. No. 3,563,809), are used to direct gaseous ions to the implantation chamber. In such systems, magnetic deflection of accelerated ions from a gaseous source is used to extract ions of selected mass or momentum. In contradistinction, an object of the present invention is the utilization of a plasma expansion source of implantation ions.

Solid sources generally have not been used because of the difficulty in evaporating and ionizing the source material in the implantation chamber. The presence of vaporized, non-ionized atoms of source material in the deposition chamber heretofore has been a detriment. Another object of the present invention is to provide a system facilitating the use of solid source material vaporized within the high vacuum ion-implantation chamber. Non-ionized atoms of source material advantageously are used for contact formation concurrent with and/or subsequent to ion implantation.

Source materials used in the past for ion implantation include phosphorous, boron, antimony and arsenic, all well known for p-n junction formation. McCaldin (U.S. Pat. No. 3,293,084) employs alkali metals such as sodium, potassium, rubidium and cessium for ion implantation. These materials readily are obtainable as gaseous sources. In the past, the use of refractory materials such as nickel and palladium for ion implantation has not been practical. The very high vaporization temperature of these materials made if difficult or impossible to obtain them in gaseous form. The present invention has as another objective the ion implantation of refractory materials.

Large area ion implantation has been difficult to achieve in the past. Extracted beam systems using magnetic mass or momentum separation provide a fine beam of ions useful for micromachining or implantation in small areas. However electrostatic deflection in a raster pattern is required to obtain large area implantation. Such raster scanning adds to equipment complexity. Another object of the present invention is to provide a method for large area ion implantation, facilitating the formation of large junctions, and/or the ion bombardment of many substrates without the need for raster scanning. The method is useful, e.g., in the formation of large area junctions for high power applications such as high voltage or high current diodes.

Most prior art ion implantation systems have operated at high energy, typically in the range of 10 keV to 150 keV. Phosphorous or boron implantation energies on the order of 50 keV often are used. Moreover, ion densities particularly in extracted beam systems are low, requiring relatively long implantation times for effective substrate doping (and/or necessitating raster scanning, as mentioned above). The formation of shallow junctions is difficult. An object of the present invention is to provide a low energy ion bombardment system, capable of operating with a high ion density across a large area. Shallow junction formation is facilitated, and short implantation times are typical.

Ion bombardment into crystalline targets such as semiconductor substrate material results in substantial damage to the crystal lattice. Further the ions usually are injected into interstitial locations. Annealing is required to promote repair of damaged lattice structure and to enable the injected ions to assume substitutional position. Typically such annealing comprises heating the substrate either during or subsequent to ion bombardment, to a temperature at which realignment of the crystalline lattice occurs and at which the injected ions assume substitutional positions within the lattice. Assumption of such substitutional positions enables the injected ions to play the role of donor or acceptor, such electrical activity thereby accomplishing junction formation.

In one known system, a heater in contact with the target support is used to heat the semiconductor substrate during implantation to an annealing temperature on the order of 600°C. Other systems require transfer of the substrate to a separate oven for post-implantation annealing. An object of the present invention is to provide unique system of during and/or post-implantation annealing using a combination of heat and electron bombardment within the ion-implantation chamber.

Contact formation for ion implanted junctions typically has been carried out in a chamber separate from that in which the ion bombardment occurred. That is, the substrates were removed to a separate vacuum deposition chamber wherein aluminum, gold or other metal was sputtered or vapor deposited onto the substrate to form the contact. Many complications are associated with this prior art approach. First, transfer of the substrates from one chamber to another adds another handling step, and exposes the incompleted devices to atmospheric contamination. Diffusion or migration of the electrode material into the ion bombarded region, or diffusion of the implanted ions, may occur when high temperatures are encountered. Partly because of the migration problem, certain materials are incompatible with such subsequent contact formation processes. Also, it has been difficult to form contacts which permit direct flow soldering and thus eliminate the need for wire bonding of electrical connection wires.

Thus a further object of the present invention is to provide a system wherein electrodes or ohmic contacts can be formed simultaneously with ion implantation and junction formation. This is accomplished by the kinetic transport vacuum deposition of refractory metal or other atoms within the ion implantation chamber. Moreover, by using simultaneous ion bombardment and kinetic transport deposition, different materials can be layered one atop the other including refractory materials which normally are considered non-compatible.

Another object is to provide an improved method for "pre-depping" semiconductor devices. In the fabrication of diffused junctions, surface irregularities such as oxide spots may be present on the substrate which prevent uniform diffusion through the surface. Thus when conventional diffusion techniques are used, non-uniform dopant concentrations result. Such non-uniformities can be eliminated by using ion implantation to pre-deposit dopent material in high concentration into the subsurface region, then heating the substrate to promote diffusion of the implanted dopants.

SUMMARY OF THE INVENTION

These and other objects are achieved by providing a process for low energy, high density ion implantation of refractory and other materials. Pre-implantation cleaning, ion implantation, kinetic transport deposition for electrode formation, and post-implantation anneal all are carried out in the same high vacuum chamber, from which the target substrates are not removed during the processing steps. The chamber also houses a conical electron beam gun for ionizing refractory or other source materials, to provide a plasma expansion source for ion bombardment and contact deposition. The arrangement permits the use of refractory elements such as nickel and palladium for device fabrication.

Post-etch cleaning and/or pre-implantation anneal of the semi-conductor target substrates is accomplished in the high vacuum chamber by flooding the substrates with electrons from an annular filament. This electron bombardment heats the substrates to above 100°C. to achieve desorption of etchant or other fluids from the substrate, and to anneal lattice defects.

A high energy conical electron beam focused on a refractory or other material in a crucible causes vaporization of the source material and ionization of some vaporized particles. The resultant expanding plasma serves as a source of both ions for implantation and atoms for kinetic transport deposition. An electrostatic field, in the absence of an external magnetic field, accelerates the ions toward the substrate to accomplish shallow, low energy implantation with high ion concentrations over a large area. Simultaneous kinetic transport of vaporized atoms provides a layer of refractory metal on the substrate to form an ohmic contact for the implanted region. Formation of the contact may continue after ion implantation has been completed to obtain substantial contact thickness. During ion implantation the substrates remain at relatively low temperature. Electrons from the flood filament cancel the positive charge of the implanted ions. Continued electron flooding after implantation heats the substrate to a temperature sufficient to anneal lattice damage due to ion bombardment, and to promote relocation of implanted ions from interstitial to substitutional positions in the lattice.

A different material subsequently may be deposited onto a previously formed layer using the combined ion implantation and kinetic transport deposition technique. This permits the layering of materials which normally are incompatible. For example, nickel may be implanted into silicon to form a shallow junction with concomitant formation of a nickel electrode. Then aluminum may be layered onto the nickel using the inventive process wherein aluminum ions are implanted into the nickel to provide an effective bond to aluminum atoms simultaneously deposited by kinetic transport atop the nickel. This technique permits formation of contacts which can be directly flow soldered, and is useful for other plating or electrode forming applications.

BRIEF DESCRIPTION OF THE DRAWINGS

A detailed description of the invention will be made with reference to the accompanying drawings, wherein like numerals designate corresponding parts in the several figures.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Structural and operational characteristics attributed to forms of the invention first described also shall be attributed to forms later described, unless such characteristics obviously are inapplicable or unless specific exception is made.

Figure 1:
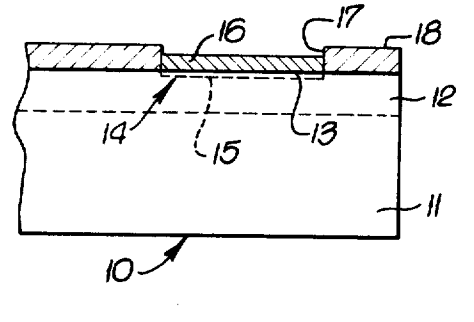
FIG. 1 is a transverse sectional view of a typical semiconductor device formed using the inventive ion implantation and kinetic transport deposition process.

Referring first to FIG. 1 there is shown a typical semiconductor device 10 fabricated using the inventive ion implantation system. The device 10 is formed in a wafer or substrate 11 of silicon or like semiconductive material, having a relatively thin epitaxial layer 12 predoped to either n or p type conductivity. Within the layer 12 is a shallow region 13 of different conductivity, formed by ion implantation. The regions 12 and 13 together comprise a rectifying junction 14, the junction depth being indicated by the broken line 15. Electrical connection to the ion implanted region 13 is made by an ohmic contact 16 which, also in accordance with the present invention, is formed simultaneously with and/or subsequent to ion implantation. The area of the junction 14 and the contact 16 is defined by an opening 17 in an $SiO_2$ or other layer 18 used as a mask.

Typically a plurality of devices 10 are formed simultaneously in the wafer 11 which later may be segmented to separate individual devices. The device 10 (FIG. 1) may be fabricated using the apparatus 20 of FIG. 2. Initially each wafer 11 is polished mechanically to an optical finish, then cleaned with an etchant to obtain a fine surface. One or more wafers 11 are mounted on a target holder 21 which is appropriately supported within the apparatus 20 near the top of a vacuum chamber 22. A conventional pump system 23 is used to evacuate the chamber 22 to a very high vacuum on the order of $10^{-7}$ to $10^{-8}$ Torr. The chamber 22 may be back flushed with argon to remove residual gases.

Pre-implantation cleaning and annealing of the wafers 11 is accomplished within the chamber 22 by flooding the targets with electrons from an annular flood filament 24. The filament 24, typically niobium tantalate, is situated about eight centimeters below the target holder 21. An adjustable power supply 25 provides power to the filament 24. When the power supply 25 is adjusted to a relatively low level (e.g., 400 watts) the filament 24 functions primarily as a radiant heat source. With the supply 25 adjusted to a higher level (e.g., 600 watts), electrons are emitted from the filament 24. These electrons are accelerated toward the target wafers 11 by an electric field achieved by biasing the filament 24 to about −2 keV with respect to the electrically grounded target holder 21. This flood electron acceleration voltage is provided by a power supply 26.

The flood of electrons striking the wafers 11 accomplishes annealing and cleaning. The electron energy partly is transferred directly to the semiconductor lattice and partly is dissipated as heat, causing the temperature of the wafers 11 to rise substantially. The combined heating and energy transfer results in a realignment of semiconductor material into an orderly crystalline lattice. Faults, dislocations and other lattice defects are annealed out, thereby providing a relatively perfect crystalline material of device grade. The heating also causes gases, water and other etchant fluids to be desorbed from the wafers 11, 17 for evacuation from the chamber 22. During this pre-implantation anneal the wafers 11 preferably are heated to a temperature above 100°C, this temperature being monitored with a thermocouple 28 mounted directly to the target holder 21. Such annealing may be accomplished in ten to twenty minutes, using an electron flux of about 10 to 20 $ma/cm^2$ with an acceleration potential of about 2 keV.

The cleaned and annealed substrates 11 next are allowed to cool down, typically to a temperature of from 25°C. to 50°C. To aid in such cooling, water or other fluid may be circulated through a cooling tube 29 mounted in heat conducting contact with the target holder 21. The wafers 11 then are ready for ion implantation and contact formation; these steps are accomplished within the same apparatus 20 so that the cleaned wafers are neither handled nor transferred subsequent to the pre-implantation anneal.

The source material 32 used for ion implantation and contact formation is contained in a crucible 33 situated near the bottom of the apparatus 20. The material 32 is vaporized and ionized by a conical electron beam 34 provided by an annular electron filament 35. As described below, the electrons are electrostatically accelerated toward and implanted in the target 11 to form the region 13 (FIG. 1), while simultaneously and subsequently the unionized, vaporized atoms of the source material 32 are kinetically transported to the wafer 11 to form the contact 16. The filament 35 is mounted horizontally about twenty centimeters above the crucible 33 and is generally coaxial with the vertical axis of the chamber 22. A power supply 36 provides sufficient power (e.g., 600 watts) to the niobium tantalate filament 35 to insure substantial electron emission. The electrons are accelerated toward the electrically grounded crucible 33 with an energy of about 4 keV, the filament 35 being biased to a corresponding negative potential by a power supply 37. The electrons converge on the source material 32 as a conical beam, which is further focused by an annular, electrostatic focusing assembly 38 maintained at a positive potential of about 400 volts by a power supply 39.

By focusing the electron beam 34 at the center of the source material 32, the source is heated to a very high temperature, typically 2000°C. to 3000°C., sufficient to vaporize refractory materials such as nickel or palladium. Collision of electrons from the beam 34 with vaporized atoms results in ionization of some portion (perhaps less than 10 percent) of the particles evaporated from the source 32. The vaporized and ionized source material forms a plasma cloud in the region designated 42, the cloud having a typical density of $10^9$ particles per cubic centimeter. The particles vaporized from the source may have a kinetic energy as great as 4 keV, equal to the electron energy of the beam 34. This kinetic energy causes the cloud to expand, so that the apparatus 20 may be characterized as having a "plasma expansion" source. A high vacuum is maintained in the chamber 22, since at 4 keV the minimum pressure to obtain a plasma which will expand is about $10^{-7}$ Torr.

For ion implantation, ions from the plasma cloud are accelerated by an electric field provided by a generally cylindrical screen 43 surrounding the upper portion of the ion trajectory. The screen 43 is maintained at a high negative potential (e.g., −10 keV) by a power supply 44. The resultant electrostatic field accelerates the positively charged ions toward the wafers 11 with a selected energy which is the sum of the kinetic energy imparted upon vaporization and the acceleration energy. Thus by adjusting the power supply 44, the implantation energy may be controlled to achieve a desired depth of ion penetration into the substrate 11, and hence to control the junction depth 15.

To control the duration of ion implantation, a shutter 45 is interposed in the trajectory between the source 32 and the target 11. Generally the shutter 45 is maintained closed when the beam 34 first is turned on, so that some source vaporization and plasma formation occur prior to actual ion implantation. When a sufficient ion cloud density has been obtained, the shutter 45 is opened mechanically using a linkage 46 operable outside of the vacuum chamber 22. With a potential applied to the screen 43, the ions are accelerated toward and enter the wafers 11 to form the ion implanted region 13. During such implantation, the targets 11 are flooded by electrons from the filament 24 to neutralize the charge of the impinging ions.

With an acceleration potential of about 5 keV, the typical ion current density in the apparatus 20 is between about 20 and 60 microamperes per square centimeter. This ion density is relatively constant over a quite large area, so that uniform implantation can be achieved over an extended target zone, for example, across a circular area having a 45 centimeter diameter. An implantation region 13 having a depth of about 200 A and a very high implanted ion concentration (e.g., $10^{16}$ ions/cc) typically can be obtained in several seconds. Of course, the depth of penetration and the implanted ion density will depend on various parameters including the ion acceleration potential, the type of source material, the ion cloud density, and the time of exposure. In production use, the values of these implantation parameters will be selected to achieve particular device characteristics. The relatively high ion current density (typically 20–60 $\mu A/cm^2$) and low acceleration potential (typically but not necessarily less than 10 keV) should be contrasted with prior art techniques wherein current densities of 1 microampere per square centimeter, and acceleration potentials of greater than 50 keV are typical.

Simultaneous with ion implantation, the non-ionized atoms vaporized from the source 32 will be kinetically transported toward the target holder 21 and will deposit onto the surface of the wafers 11 to begin formation of the contacts 16. Since the density of non-ionized atoms is considerably greater than the ion density, significant buildup of the contact layer will occur in a short period of time. This has the desirable result of beginning contact formation simultaneous with ion implantation.

Since formation of the ion implanted junction occurs very rapidly, typically within several seconds, the thickness of contact material deposited concurrent with ion implantation is much less than that optimally desired. Accordingly, kinetic transport deposition of non-ionized source material usually is continued for some period of time after implantation is completed. Typically, the acceleration potential from the supply 44 is turned off to terminate implantation, but the shutter 45 is left open so that additional non-ionized atoms can be deposited onto the targets 11. When sufficient contact 16 thickness (typically 2000 A to 3000 A) has been achieved, the shutter 45 is closed, and the electron beam 34 is turned off to terminate source vaporization.

Several factors affect the time duration for contact 16 formation. One is the electron beam 34 energy. As this is increased, vaporization increases. Therefore, it may be advantageous to turn up the beam energy subsequent to ion implantation, and thereby speed contact formation. Lower beam energy, and hence a lower vaporization rate is preferred during ion implantation, since if the contact 16 layer builds up too fast, this layer will block the impinging ions, prematurely stopping ion implantation before the desired ion density is achieved in the substrate 11.

Another factor is that the source vaporization rate increases exponentially with time. Therefore, it is desirable to carry out ion implantation shortly after the electron beam 34 has been turned on to start the vaporization, and to form the contact at a later time after a much higher vaporization rate has been achieved. To accomplish this, the shutter 45 may be closed for some duration between the completion of ion implantation and a later time when the vaporization rate has increased substantially. At such later time the shutter 45 again is opened to permit rapid formation of the contact 16.

Very high contact 16 deposition rates (e.g., greater than 1000 A per minute) can be achieved using the apparatus 20. The specific contact deposition rate will depend not only on the factors noted above, but also on the particular material being used. For example, in a five minute deposition period, 2000 A of nickel, or 4000 A of palladium or 10,000 A of aluminum may be deposited with like electron beam 34 energy.

During the very short ion implantation period, the temperature of the waters 11 remains relatively low, typically 25°C. to 50°C. This low temperature increases ion solubility, thereby helping achieve a very high implanted ion density in a short time in the regions 13. Later, during buildup of the contacts 16, the temperature of the waters 11 increases substantially as a result of both flood electron and non-ionized atom bombardment, and by radiant heating from the very hot source material 32. Typically the wafers 11 may rise to a temperature of between 250°C. and 350°C. during contact formation. This temperature rise is not undesirable, since generally the devices 10 next are subjected to a post-implantation anneal at an even high temperature.

Post-implantation annealing of the devices 10 is desirable to repair lattice defects caused by the ion bombardment, and to promote relocation of injected ions from interstitial to substitutional positions in the semiconductor lattice. It is primarily in such substitutional positions that the injected ions can become electrically active as donor or acceptor charge carriers.

In accordance with the present invention, post-implantation annealing is accomplished within the apparatus 20 by exposing the target wafers 11 to flood electrons and heat from the filament 24. Specifically, the shutter 45 is closed at the end of contact formation, but the filament 24 is left on at an energy level sufficient to heat the wafers rapidly to above the annealing threshold temperature of the substrate material. For silicon, this annealing threshhold is on the order of 350°C., and the flood filament 24 is used to force the temperature of the wafers rapidly up to about 450°C. The wafers 11 are maintained at this elevated temperature for a short period of time, typically 1 to 2 minutes. This short time is sufficient to accomplish lattic defect repair and implanted ion relocation, but is not so long as to result in diffusion of either the implanted ions or the contact material. The flood filament 24 then is turned off and the target wafers 11 are force cooled, as by flowing a liquid through the cooling tubes 29 on the target holder 21.

The wafers 11 processed as just described may be removed from the apparatus 20 and separated into individual useful devices 10. Alternatively, the wafers 11 may be subjected to additional processing steps within the apparatus 20. For example, a different source material may be ion implanted into other areas of the substrate 10, or a dissimilar material may be deposited upon the previously formed contact regions.

For ion implantation into other areas of the substrates, a second crucible (not shown) containing a different source material is moved into position at the apex of the conical electron beam 34. Ion implantation and contact formation are carried out as described above, but through a separate mask suitably situated to insure that this subsequent bombardment will be onto substrate regions different from those previously processed.

Figure 3:
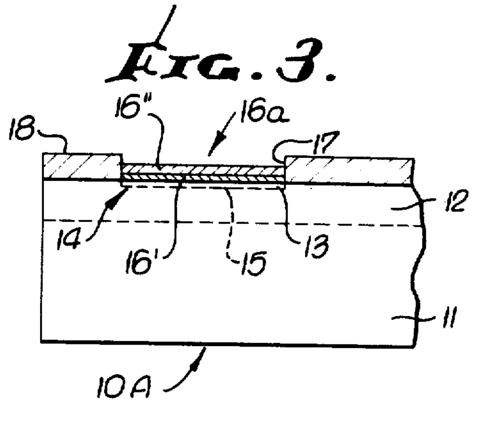
FIG. 3 is a transverse sectional view of another device formed by the inventive process and including an electrode having layers of different, normally non-compatible materials.

FIG. 3 shows another device 10A wherein the ohmic contact 16a includes layers 16', 16'' of different materials. The ion implanted region 13 and the subjacent contact layer 16' are formed as described above, except that the layer 16' is relatively thin (e.g., 1000 A). The overlying contact layer 16'' is formed by combined ion implantation and kinetic transport deposition of a different source material vaporized by the conical electron beam 34. During such formation, ions of the second source material are implanted into the subjacent layer 16' to provide an intimate bond to the newly deposited layer 16''. Kinetic transport deposition continues until the layer 16'' has built up a desired thickness (e.g., 1 micron).

Use of the process as just described permits an underlying stratum to be plated with a second material which normally could not be bonded to the underlayer. For example, the ion implanted region 13 and the initial contact layer 16' of the device 10A (FIG. 3) may be formed of nickel, while the relatively thick overlayer 16'' may comprise aluminum.

Additional layers of different material may be deposited by repeating the inventive process. This is useful in the formation of contacts which can be directly flow soldered. Wire bonding to aluminum contacts readily can be carried out, but flow soldering to such contacts is difficult, because exposure of the device to the atmosphere results in formation of aluminum oxide which inhibits flow soldering. Such oxide formation can be prevented by depositing a very thin (e.g., 1000 A) layer of nickel or palladium atop the aluminum layer 16'' using the inventive process. Since the top layer is formed without removing the wafer from the vacuum chamber 22, no oxide forms between the aluminum and nickel or palladium layers. The nickel or palladium itself does not readily oxidize, and serves as a protective layer preventing oxidation of the aluminum when the device 10 later is removed from the apparatus 20. Direct flow soldering of such contacts is facilitated.

Thus the inventive process also is useful for forming adjacent layers of different materials such as refractory metals which normally cannot be effectively plated one to the other. The effectiveness of the present invention resides in the unique combination of low energy, high density ion bombardment coupled with kinetic transport of non-ionized atoms of the same material. The ions are implanted into the subjacent layer to provide an effective bond between that layer and the kinetically transported atoms of the second material which are deposited to form the subsequent layer.

It is emphasized that all of the process steps are carried out at very high vacuum, and hence in a hyperclean atmosphere. This insures the absence of oxidation and contamination of the semi-conductor, metallic or other materials processed or deposited in accordance with the invention, and further enhances the ability to form high grade junction devices and to deposit adjacent layers of dissimilar materials. While certain refractory materials have been given as examples, the invention is not so limited, and other materials, either refractory or not, may be implanted and deposited using the inventive process.

Figure 2:
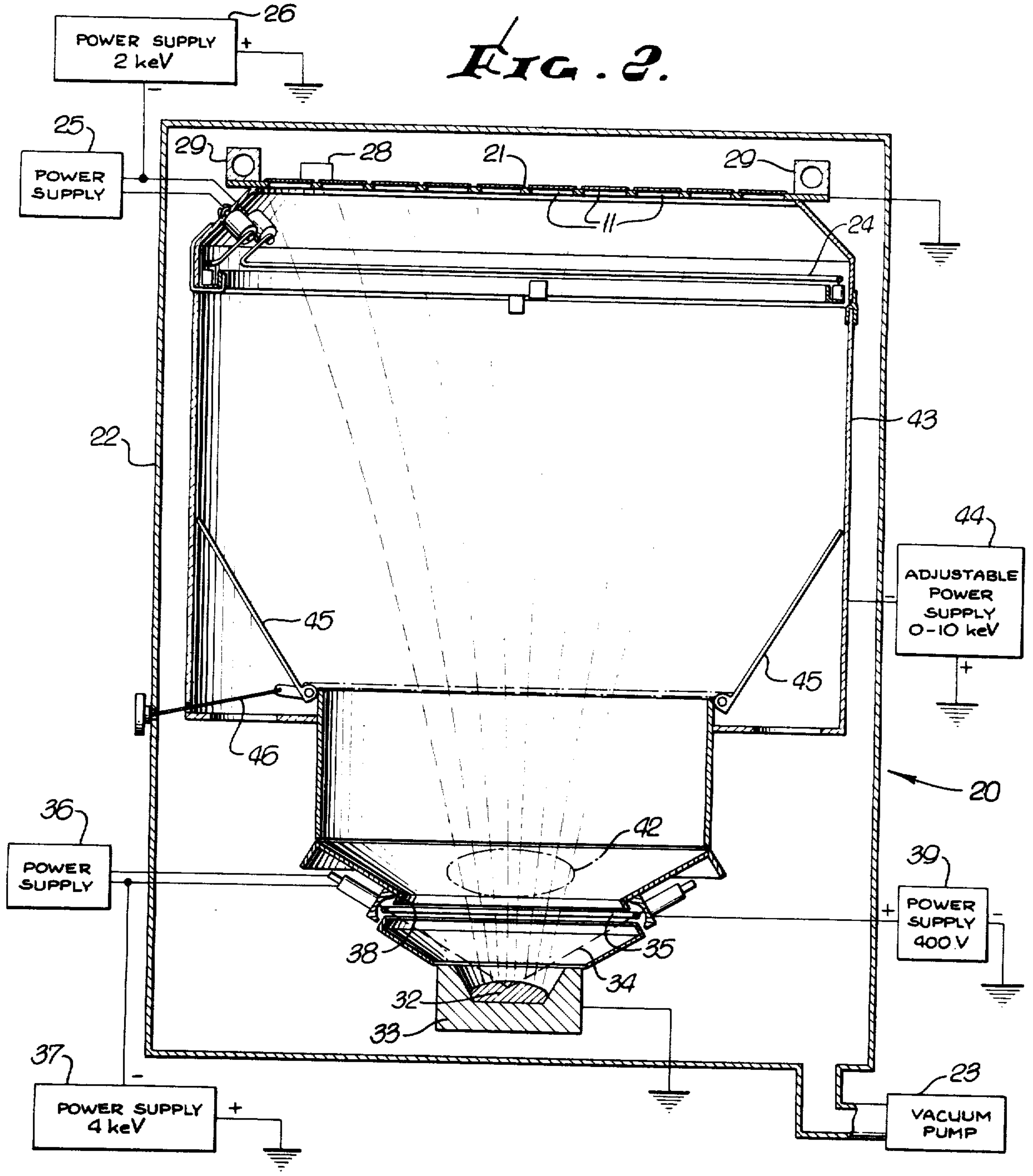
FIG. 2 is a pictorial view, shown partly in transverse section, of a preferred apparatus for carrying out the inventive ion implantation process.

Another application of the inventive process is for "pre-depping" semiconductor devices. For this purpose, ion implantation using the apparatus of FIG. 2 is carried out at energies up to about 60 keV. The high ion density results in a high implanted ion concentration at depths up to as much as about 1000 A. Concurrently, non-ionized particles of the source material are deposited by kinetic transport onto the substrate surface. Following such predepping, the targets are heated to a temperature sufficient to diffuse the implanted ions (and optionally, the particles deposited on the surface) into the substrates. The resultant devices have very uniform diffusion regions, free of irregularities in dopant concentration. Such uniform diffusion results even through surface impurities or imperfections may have been present on the substrate prior to pre-depping. Preferably such pre-depping follows electron-bombardment cleaning as described above. Additional kinetic transport deposition may be carried out subsequent to ion implantation but prior to diffusion heating to provide additional deposited material for diffusion into the substrate.

Intending to claim all novel, useful and unobvious features shown or described, the inventor makes the following:

1. A combined ion implantation and kinetic transport deposition process comprising:

vaporizing a solid source material within a chamber under high vacuum using an electron beam directed toward said solid source material, said beam also ionizing a portion of the vaporized particles of source material, thereby forming an expanding plasma, implanting ions from said plasma into a target by electrostatically accelerating said ions toward said target for implantation therein in the absence of an external magnetic field, while permitting kinetically transported atoms from said plasma to deposit as a layer atop the ion implanted region of said target.

2. A process according to claim 1 wherein said electrostatic acceleration is terminated prior to termination of said kinetic transport, thereby increasing the thickness of said deposited layer.

3. A process according to claim 1 wherein said target comprises a semiconductor substrate, said implanted ions forming a junction in said substrate, said deposited atoms forming an electrode for said junction.

4. A process according to claim 3 further comprising: annealing said substrate within said chamber employing electron bombardment.

5. A process according to claim 4 wherein said annealing is carried out subsequent to said ion implantation and kinetic transport deposition, said electron bombardment heating said substrate to above an annealing threshhold temperature of said semiconductor for a time duration sufficient to anneal lattice damage and to transfer implanted ions from interstitial to substitutional positions, but short enough to prevent diffusion of implanted ions, said substrate then being rapidly cooled.

6. A process according to claim 5 wherein the temperature of said substrate is maintained below said semi-conductor annealing threshhold during said ion implantation.

7. A process according to claim 3 further comprising: heating said substrate by electron bombardment, prior to ion implantation, to a temperature sufficient to desorb fluids or gases from said substrate.

8. A process according to claim 1 wherein said electron beam is conical and focused on said source material, the energy of said beam being sufficient to vaporize solid refractory material.

9. A process according to claim 1 followed by like ion implantation and kinetic transport deposition of a different vaporized source material, ions of said different material being implanted into the previously deposited layer to bond the kinetically transported different material to said previous layer.

10. A process according to claim 2 wherein said ion implantation is carried out shortly after vaporization of said source material begins, the vaporization rate then being relatively low, and wherein kinetic transport deposition is continued at a later time after the vaporization rate has increased substantially.

11. A process according to claim 3 wherein the ion acceleration potential is below about 10 keV and wherein the ion current density is above about 1 $ma/cm^2$, thereby facilitating formation of shallow junctions having high implanted ion concentration.

12. A process for the formation of a semiconductor device including a shallow junction and an ohmic contact therefor, comprising:

placing a semiconductor wafer in a chamber, evacuating said chamber to a high vacuum, using an electron beam to vaporize source material within said evacuated chamber, said beam ionizing some of the vaporized material, and electrostatically accelerating said ionized material toward said wafer with sufficient energy to implant said ions into a shallow region of said wafer, non-ionized vaporized particles of source material being deposited atop the surface of said wafer region concurrent with said ion implantation to begin contact formation.

13. A process according to claim 12 comprising the further step of:

continuing the deposition of said non-ionized particles of source material subsequent to completion of ion implantation to allow build-up of said contact to a substantial thickness.

14. A process according to claim 12 wherein said source material comprises a refractory metal.

15. A process according to claim 14 wherein the energy of said electron beam is sufficient to vaporize said refractory material, and wherein said non-ionized particles are kinetically transported toward said wafer with energies imparted upon vaporization by said electron beam.

16. A process according to claim 13 wherein further comprising:

selectively blocking the transport path of said vaporized material to said wafer to control the duration of deposition.

17. A process according to claim 16 wherein said path is blocked for a period of time between completion of ion implantation and the continued kinetic transport deposition for contact thickness build-up, the vaporization rate increasing substantially during the time said path is blocked so that a high deposition rate is achieved when said path again is opened.

18. A process according to claim 13 wherein said wafers are situated in a target area near one end of said chamber, wherein said source material is situated near the other end of said chamber at the apex of a conical electron beam produced by an annular electron gun assembly mounted generally coaxially with the common axis of said source material and the center of said target area, and wherein an electrostatic ion acceleration field is produced from a cylindrical screen surrounding a portion of the ion trajectory between said source and said target area.

19. A process according to claim 12 preceeded by the step of;

pre-implantation cleaning said semiconductor wafer in said chamber under high vacuum, said cleaning comprising heating said wafer by electron bombardment to a temperature in excess of about 100°C.

20. A process according to claim 13 followed by the step of;

electron bombardment annealing said semiconductor wafer in said same chamber under high vacuum.

21. A process according to claim 20 wherein said wafers are mounted on a target holder within said chamber, said electron bombardment annealing comprising flooding said wafers with electrons from an annular flood filament mounted within said chamber surrounding the transport path to said wafers, said electron bombardment raising the temperature of said wafers to above an annealing threshold said wafers then being force cooled to below said threshold temperature.

22. A process according to claim 12 followed by like ion implantation and concurrent kinetic transport deposition of a vaporized different source material to form a layer of said different material atop the previously formed contact.

23. A semiconductor device formed according to the process of claim 12.

24. A process for depositing a layer of a second material onto a stratum of a first material, comprising:

placing a target including said stratum into a chamber and evacuating said chamber, producing in said evacuated chamber an expanding plasma source including both ions and non-ionized atoms of said second material, electrostatically accelerating ions from said plasma toward said target for implantation into said stratum, and concurrently permitting kinetic transport of said non-ionized atoms from said plasma toward said target to begin deposition of said layer above the ion implanted portion of said stratum.

25. A process according to claim 24 wherein said stratum comprises non-semiconductive material, and wherein said ion implantation is to a depth less than the thickness of said stratum, said implantation aiding to bond said deposited layer to said stratum.

26. A process according to claim 25 wherein said first and second materials are different refractory metals.

27. A process according to claim 24 wherein said first material is a semiconductor, said implantation changing the conductivity characteristics of a region of said semiconductor, said layer comprising an electrode for said region.

28. A process according to claim 24 wherein said expanding plasma is produced by using a high energy conical electron beam to vaporize a solid source of said second material within said evacuated chamber, the pressure in said chamber being sufficiently low to maintain said plasma.

29. A process according to claim 25 further comprising:

continuing said kinetic transport deposition after termination of said ion implantation to increase the thickness of said layer.

30. A process according to claim 29 wherein said ion implantation is carried out while the vaporization rate is relatively low and wherein said continued kinetic transport is carried out later when the vaporization rate has increased significantly, kinetic transport being blocked for a period of time between said concurrent transport and said continued transport.

31. A process according to claim 26 and wherein said second material comprises nickel, said process then being repeated to form an aluminum layer atop the deposited nickel layer.

32. A combined ion implantation and kinetic transport deposition process comprising:

mounting a target within a chamber, evacuating said chamber to between $10^{-7}$ and $10^{-9}$ Torr, using an annular electron gun assembly within said evacuated chamber to vaporize a solid source material contained in a crucible situated at the apex of a conical electron beam produced by said assembly, said beam also ionizing some of the vaporized source material, an expanding plasma thereby being produced in the region above said crucible, producing an electrostatic field within said chamber to accelerate ions from said plasma toward said target wafer for implantation therein, flooding said target wafer with electrons from an annular filament situated within said chamber to neutralize the charge of said accelerated ions, permitting non-ionized particles from said plasma to be transported kinetically to said target wafers, and terminating said ion implantation but subsequently permitting additional kinetic transport deposition to increase the thickness of the layer resultant from such deposition.

33. A process according to claim 32 wherein said electrostatic field has a potential of less than about 10 keV and wherein said conical electron beam has an energy of less than about 5 keV but great enough to vaporize refractory materials.

34. A process according to claim 32 wherein said target wafer is a semiconductor, said semiconductor being heated to above about 100°C. by electron bombardment from said annular filament prior to ion implantation to desorb contaminants therefrom.

35. A process according to claim 32 wherein said target wafer is a semiconductor, said semiconductor being annealed subsequent to ion implantation by electron bombardment from said annular filament, said semiconductor wafer thereafter being force cooled by a liquid circulated through a coolant tube on said wafer mount.

36. A process for pre-depping a semiconductor device, comprising:

placing a semiconductor substrate in a chamber, evacuating said chamber to a high vacuum, using an electron beam to vaporize source material within said evacuated chamber, said beam ionizing some of the vaporized material, electrostatically accelerating said ionized material toward said substrate with an acceleration energy of up to about 60 keV to implant a high concentration of said ions into a surface-adjacent region of said substrate, non-ionized vaporized particles of source material being deposited atop the surface of said substrate region concurrent with said ion implantation, and heating said substrate to a temperature sufficient to diffuse said implanted ions in said substrate to provide a diffused region of uniform concentration.

37. A process according to claim 36 comprising the preliminary step of:

cleaning said substrate by electron bombardment in said evacuated chamber prior to said ion implantation, and wherein said heating to cause diffusion also is carried out in said high vacuum chamber.

38. A process according to claim 36 comprising the additional step of depositing additional vaporized source material by kinetic transport onto the surface of said substrate subsequent to said ion implantation, said material being diffused into said substrate by said heating.

* * * * *